United States Patent
Graichen

(10) Patent No.: US 12,140,042 B2
(45) Date of Patent: Nov. 12, 2024

(54) ENGINE OR COMPRESSOR BLADE

(71) Applicant: Siemens Energy Global GmbH & Co. KG, Bayern (DE)

(72) Inventor: Andreas Graichen, Norrkoping (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 15 days.

(21) Appl. No.: 17/616,654

(22) PCT Filed: Jun. 10, 2020

(86) PCT No.: PCT/EP2020/066117
§ 371 (c)(1),
(2) Date: Dec. 5, 2021

(87) PCT Pub. No.: WO2020/249627
PCT Pub. Date: Dec. 17, 2020

(65) Prior Publication Data
US 2022/0228489 A1   Jul. 21, 2022

(30) Foreign Application Priority Data

Jun. 13, 2019   (EP) .................... 19179996

(51) Int. Cl.
*F01D 5/14*   (2006.01)
*F01D 5/28*   (2006.01)

(52) U.S. Cl.
CPC ............ *F01D 5/147* (2013.01); *F01D 5/282* (2013.01); *F05D 2230/50* (2013.01); *F05D 2300/614* (2013.01)

(58) Field of Classification Search
CPC ......... F01D 5/147; F01D 5/14; F05D 2230/50
See application file for complete search history.

(56) References Cited

U.S. PATENT DOCUMENTS

| 3,981,616 | A | * | 9/1976 | Stargardter | ............. F01D 5/147 416/233 |
| 4,285,634 | A | | 8/1981 | Rossman et al. | |
| 7,322,796 | B2 | * | 1/2008 | Pietraszkiewicz | ...... F01D 5/147 29/889.22 |
| 8,100,653 | B2 | * | 1/2012 | Gerakis | ................... F01D 5/284 416/96 A |

(Continued)

FOREIGN PATENT DOCUMENTS

| CN | 102220945 A | 10/2011 |
| CN | 106103898 A | 11/2016 |

(Continued)

OTHER PUBLICATIONS

PCT International Search Report and Written Opinion of International Searching Authority mailed Mar. 9, 2020 corresponding to PCT International Application No. PCT/EP2020/066117 filed Oct. 6, 2020.

*Primary Examiner* — Michael L Sehn
(74) *Attorney, Agent, or Firm* — Wolter Van Dyke Davis, PLLC

(57) ABSTRACT

An optimized blade with an anchor element to be used in a streaming engine and method of manufacturing such blade. The blade contains a lower part, an upper part and an anchor element, wherein the anchor element is located inside of the blade, and wherein the anchor element connects the lower part and the upper part.

14 Claims, 2 Drawing Sheets

(56) References Cited

U.S. PATENT DOCUMENTS

| | | | | |
|---|---|---|---|---|
| 8,142,163 | B1* | 3/2012 | Davies | F01D 5/187 |
| | | | | 416/225 |
| 8,475,132 | B2* | 7/2013 | Zhang | F01D 5/284 |
| | | | | 416/232 |
| 9,938,838 | B2* | 4/2018 | Witz | F01D 5/20 |
| 10,815,795 | B2* | 10/2020 | Ganiger | F04D 29/388 |
| 2008/0310965 | A1 | 12/2008 | Gerakis et al. | |
| 2011/0274553 | A1 | 11/2011 | Stiesdal | |
| 2012/0237355 | A1 | 9/2012 | Zhang et al. | |
| 2015/0218954 | A1 | 8/2015 | Witz et al. | |
| 2017/0022821 | A1 | 1/2017 | Ferber | |
| 2017/0343007 | A1 | 11/2017 | Murdock | |
| 2018/0051572 | A1 | 2/2018 | Hoffman | |

FOREIGN PATENT DOCUMENTS

| | | |
|---|---|---|
| DE | 102007027465 A1 | 12/2008 |
| EP | 2500519 A2 | 9/2012 |
| EP | 2902588 A1 | 8/2015 |
| NL | 7905609 A | 2/1980 |

\* cited by examiner

ENGINE OR COMPRESSOR BLADE

CROSS REFERENCE TO RELATED APPLICATIONS

This application is the US National Stage of International Application No. PCT/EP2020/066117 filed 10 Jun. 2020, and claims the benefit thereof. The International Application claims the benefit of European Application No. EP19179996 filed 13 Jun. 2019. All of the applications are incorporated by reference herein in their entirety.

FIELD OF INVENTION

The present invention refers to an optimized blade to be used in a streaming engine or compressor. Additionally, the present invention refers to the method of manufacturing such blade. Furthermore, the present invention refers to the use of such improved blade. Additionally, the present invention refers to a streaming engine providing such improved blade.

BACKGROUND OF INVENTION

Although streaming engines and compressors are very complex and very specialized technical machines the importance for modern technology should not be underrated. For example, the utilization of streaming engines in the field of generating electrical energy is highly important, was highly important in the past and will be highly important in the future. Even taking into account the growing amount of renewable energy being part of the modern energy mix streaming engines like gas turbines with the ability to compensate fluctuations resulting from wind power or solar energy represent an essential cornerstone to provide a stable electricity grid.

Although streaming engines are already being used for longer times, optimizing said engines still is a persistent task to increase the efficiency and reliability while decreasing the emissions resulting therefrom. For example, based on the limits of high temperature resistant alloys the conditions like the temperature to be used in the process are limited to certain areas. Beyond a certain point the lifetime rapidly starts to decrease on a big scale or even the reliability has to be questioned. Thus, the utilization of even highly advanced streaming engines is still restricted by certain limitations to provide a secure and reliable operation. There is still the need to further improve the existing streaming engines and their components to enable further modifications and allow alternative modes of operation increasing the overall benefit obtained with said streaming engines. The same applies to compressors being constantly subject to further improvements despite the highly advanced state already available.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to one aspect the present invention refers to a blade adapted to be used in a streaming engine or compressor, advantageously a streaming engine, wherein the blade contains a lower part, an upper part and an anchor element, wherein the anchor element is located inside of the blade, and wherein the anchor element connects the lower part and the upper part. Surprisingly, it was noted that including such anchor element in the blade allows to restrict the change of the form of the blade during the usage. Based on the combination of high temperature and big centrifugal forces resulting from the rotation of the rotor such elongation is observed beyond certain limits of operation using conventional blades. Surprisingly, it was noted that the inventive blade allows to increase the temperature used inside the streaming engine and/or to reduce the amount of the cooling fluid required to keep the temperature of the blade below a certain value to prevent such elongation. This allows, for example, to increase the overall efficiency by changing the operating conditions or to increase the reliability and/or to reduce the maintenance utilizing the standard operating parameters. Especially, increasing the overall efficiency and maximum power output of the streaming engine is highly interesting, as it allows to at least slightly upgrade existing streaming engines to meet increasing demands or gain time to replace such engines to meet increased demands of the electrical grid on the long-term.

According to a further aspect the present invention refers to a method of manufacturing an inventive blade comprising the step of inserting an anchor element inside the blade.

According to a further aspect the present invention refers to a use of an inventive blade to provide a streaming engine. Herein, providing such streaming engine includes manufacturing a new streaming engine as well as upgrading an existing streaming engine by implementing the inventive blade or servicing an existing streaming engine by replacing at least one identical used blade. Typically, it is advantageous that at least 50%, more advantageous at least 70%, even more advantageous all, blades in the turbine area, more advantageous in the turbine area and/or compressor area if available, advantageously at least in the turbine area, of the streaming engine are replaced by the inventive blades during an upgrade. The use of the inventive blades allows to easily improve the properties of an existing steaming engine with low effort.

According to a further aspect the present invention refers to a streaming engine containing an inventive blade.

To simplify understanding of the present invention it is referred to the detailed description hereafter and the figures attached as well as their description. Herein, the figures are to be understood being not limiting the scope of the present invention, but disclosing advantageous embodiments explaining the invention further and providing specific benefits to for example provide specifically adapted embodiments for specific requirements.

DETAILED DESCRIPTION OF INVENTION

Figure 1:
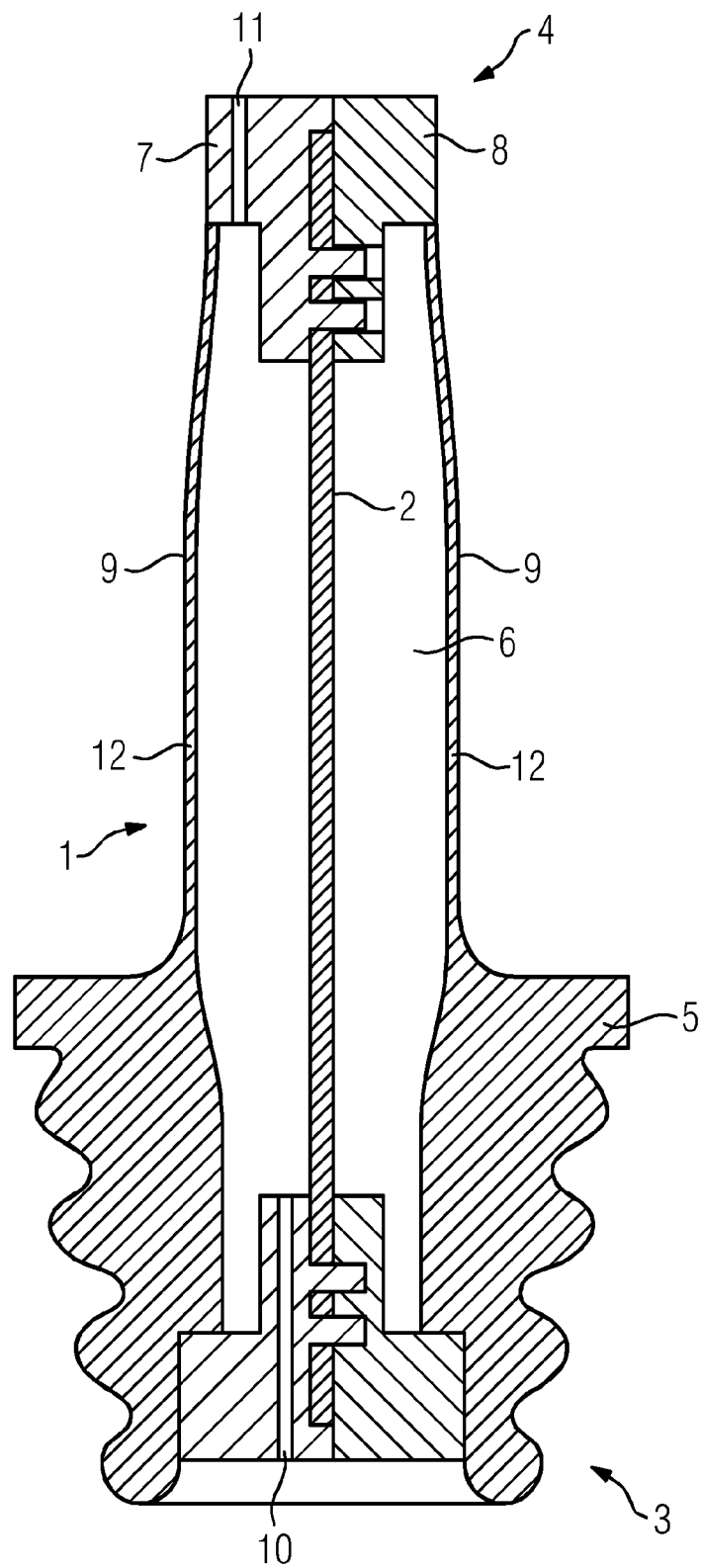
FIG. 1 shows a schematic cross-section along the longitudinal axis of the inventive blade providing the anchor element.

According to one aspect the present invention refers to a blade as described above. Typically, it is advantageous that the lower part of the blade contains a blade root.

Surprisingly, it was noted that the inventive design locating the anchor element in the blade provides many benefits. Such anchor element being completely enclosed by the blade is very effectively shielded against the harsh conditions outside the blade not only allowing to utilize materials being not able to withstand the exterior conditions. Also utilizing materials like ceramic materials provide a significantly improved resistance and reliability compared to arrangements, wherein such anchor element at least partially extends to the outer surface of the blade. Although, it is not to be understood to limit the present invention is it assumed that the demanding conditions and temperature differences on the outside lead to a at least partial significantly increased aging of such anchor element resulting in a significantly decreased lifetime and even increased risk of failure. Such failure is especially problematic for such blade as a resulting lengthening of the blade easily results in catastrophic failures of a continuous flow engine utilizing such blade.

According to further embodiments it is advantageous that the lower part of the blade contains a blade root and that the part of the blade above the blade root contains a high temperature resistant alloy, advantageously a nickel superalloy, and wherein the anchor elements consists of the different material than the high temperature resistant alloy. Although, the same material might be used in different forms, like for example metal fibers instead of the solid metal, it was noted that typically the combination of different materials allows to combine beneficial characteristics of different materials as disclosed herein to obtain significantly improved results. Typically, it is advantageous that the anchor element contains at least 50 wt.-%, more advantageous at least 70 wt.-%, even more advantageous at least 95 wt.-%, of a non-metal component like a ceramic or carbon-based material, based on the total weight of the anchor element. According to certain embodiments it completely consists of such non-metal component.

According to further embodiments it is advantageous that the blade consists of two parts and the anchor element, wherein the two parts have been manufactured using additive manufacturing. Herein, the upper part and lower part the anchor element is attached to can be part of a single of the two parts or one of the two parts can contain the upper part while the other one contains the lower part or the two parts together providing the upper and/or lower part. For example, one of the two parts can contain recesses and the other part corresponding protrusions, wherein the combination of recesses and protrusions fasten the anchor element to the upper part of the blade. Utilizing such strictly limited numbers of components allows to not only simplify the manufacturing and assembly. It was noted that this surprisingly also provides a more resistant blade being able to withstand higher forces.

According to further embodiments it is advantageous that the blade consists of two parts and the anchor element, wherein the two parts have been manufactured using additive manufacturing, wherein the two parts contain an upstream part and a downstream part. Such upstream part is characterized by that a major part of its outer surface is adapted to face an incoming stream of a fluid like a liquid or a gas utilized in a continuous flow engine. Typically, it is advantageous that such downstream part is characterized by that a major part of its outer surface is adapted to face in direction of a stream of a fluid utilized in a continuous flow engine after passing the blade. It was noted that such blade provides a further improved stability even in case of temporarily increased forces resulting from, for example, an increased mass flow passing the blade.

It was surprisingly noted that ceramic materials and carbon-based materials are very beneficial utilized to provide the inventive anchor element. In further embodiments it is advantageous that the anchor element contains a ceramic material or carbon-based material. Typically, it is advantageous that at least 50 wt.-%, more advantageous at least wt.-70%, even more advantageous at least wt.-85%, of the anchor element is selected from a ceramic material or carbon-based material. According to further embodiments the anchor element completely consists of such material. In typical embodiments it is advantageous that the aforementioned ratio of the anchor element is selected from carbon-based materials like carbon fibers or graphene, even more advantageous graphene.

Surprisingly, it was further noted that the inventive effect was also provided by a detachable connection of the anchor element inside the blade. This significantly simplifies the manufacturing and repair of the inventive blades. According to further embodiments it is advantageous that the anchor element is detachably connected to the lower and/or the upper part of the blade. Typically, it is advantageous that it is detachably connected to the lower and the upper part of the blade.

Furthermore, it was noted that for typical applications the major part of the anchor element is beneficially surrounded by a cavity. In further embodiments it is advantageous that at least 50%, more advantageous at least 65%, even more advantageous at least 85%, of the surface of the anchor element is surrounded by a cavity inside the blade. Such cavity is beneficially utilized to cool the anchor element. According to further embodiments it is advantageous that the cavity is adapted to be filled with a cooling fluid.

Although the anchor element already provides a significant improvement without any cooling, it was noted that providing a cooling of the anchor element further increases the possible range of operating conditions to utilize the inventive blade. In further embodiments it is advantageous that the blade contains a cooling system based on a cooling fluid, wherein the cooling fluid is utilized to cool the anchor element.

Furthermore, combining existing methods to increase the possible operating conditions of a blade in a streaming engine with the inventive anchor element further increases the benefits obtained herewith. For example, it was very beneficial for typical applications to include existing cooling technologies for the outer wall of the blade. According to further embodiments it is advantageous that the streaming engine is adapted to utilize a fluid stream to rotate a rotor containing the blade, wherein the blade provides an outer wall being adapted to contact the fluid stream, and wherein the cooling system is utilized to cool the outer wall. Typically, it is advantageous that the cooling fluid is utilized by means of film cooling holes to provide such cooling. Naturally, the cooling fluid can simultaneously be used to cool the anchor element and/or provide a cooling of the outer wall utilizing, for example, impingement chambers. The term "outer wall" not only refers to a metal surface on the outside of the part of the blade, but also includes coatings like a thermal barrier coating applied onto said surface. Such thermal barrier coating can, for example, consist of some ceramic material applied onto the outer surface of the blade or a bond coat on the outer surface of the blade.

Although the size of the anchor element can be reduced to extend over only a small percentage of the blade, it was noted that it advantageously extends over bigger part. This surprisingly allows to reduce the overall amount of material required while providing the same stability, for example, reducing the overall weight of the blade. Such reduced weight of the blade provides further benefits like a reduced inertia being important for the utilization in such streaming engine. In further embodiments it is advantageous that the anchor element extends over at least 30%, more advantageous at least 45%, even more advantageous at least 60%, of the height of the blade. Preferably, the height of the blade is measured from the lower end to the upper end of the blade.

Although the expert is free to utilize different possibilities known in the art to fasten the anchor element inside the blade, it was noted that a combination of protrusions and corresponding recesses provide very beneficial results for typical applications. For example, it significantly simplifies the manufacturing process of the blade. According to further embodiments it is advantageous that the anchor element provides at least one protrusion, at least one recess and/or at least one hole adapted to engage a counter element of the blade to fasten the anchor element inside the blade.

An example of an especially advantageous embodiment according to the present invention is a combination of a cooled graphene sheet extending over a major part of the blade. Such design provides very beneficial results for typical applications. In further embodiments it is advantageous that the blade contains a graphene sheet located inside the blade, wherein at least the part of the graphene sheet is cooled by a cooling fluid, and wherein the graphene sheet extends over at least 30%, more advantageous at least 45%, even more advantageous at least 60%, of the height of the blade.

Another example of a different advantageous embodiment is a combination of a ceramic anchor element extending over a major part of the blade. While such environments seems to provide an improved yet slightly decreased resistance to vibration compared to the above referenced example it seems to provide benefits with regard to the overall stability of the blade. According to further embodiments it is advantageous that the blade contains a ceramic anchor element located inside the blade, wherein the ceramic anchor element extends over at least 30%, more advantageous at least 45%, even more advantageous at least 60%, of the height of the blade.

For great variety of typical applications, it was noted that it was beneficial to utilize some carbon-based material to provide the anchor element. The flexibility yet high resistance obtained herewith is very desirable and beneficial to further optimize streaming engines. In further embodiments it is advantageous that the anchor element contains a carbon-based material like carbon fibers or graphene, advantageously graphene. For typical embodiments it is advantageous that at least a part of the anchor element representing the connection between the lower and the upper part of the blade consists of such carbon-based material.

While the anchor element can also be directly fastened inside the material of the lower part and the upper part it was noted that for typical applications and to provide benefits for the manufacturing process providing fastening elements is desirable. Especially the simplification during the manufacturing process and the repair is significant. According to further embodiments it is advantageous that the lower part contains a lower fastening element and the upper part contains an upper fastening element, wherein the lower fastening element and the upper fastening element are adapted to fasten the anchor element. Providing such modular system with predefined fastening mechanisms instead of, for example, fastening the anchor element simply to a plane surface by drilling corresponding holes in the available surface and attaching the anchor element as required is surprisingly beneficial. Although, it increases the predefined requirements for the corresponding part of the blade significantly, it was noted that it significantly simplifies the assembly of the blade as well as the repair and service work associated herewith.

For typical applications it is advantageous to provide the blade in the form of two parts and the anchor element. Herein, a very advantageous embodiment utilizes the attachment of the two parts to each other to fasten the anchor element inside the blade. According to further embodiments it is advantageous that the fastening of the anchor element inside the blade results from the attachment of the two parts to each other. For example, the anchor element can be attached to protrusions extending from one part and the position of the anchor element is locked by the second part containing recesses being adapted to fit onto the protrusions. Attaching the two parts to each other in such case results in the anchor element being clamped between the two parts.

For example, such fastening element can be realized by providing a bolt inseparably connected to one part of the blade, wherein the anchor element is mounted onto said bolt. It was noted that such embodiment allows to easily fasten the anchor element inside the blade. In further embodiments it is advantageous that the lower fastening element and/or the upper fastening element contains at least one bolt adapted to extend through an opening of the anchor element.

Furthermore, it was noted that for many cases it is advantageous to mount the anchor elements in an already strained state to provide the inventive protection against elongation of the blade during rotation already from the start. Typically, it is thus advantageous that the anchor element is already mounted inside the blade in a strained state. For example, it can be advantageous to provide the lower fastening element and/or the upper fastening elements with a gripping mechanism adapted to fix the anchor element in a strained state. For example, said gripping mechanism can be adapted to first fasten the anchor element and provide movement a second step to strain the anchor element.

According to a further aspect the present invention refers to a method as described above.

Although it is technically demanding, the obtained increased strength makes it desirable to utilize additive manufacturing process like 3D printing to directly fasten the anchor element inside of the blade during the manufacturing process. According to further embodiments it is advantageous that the blade is manufactured using additive manufacturing, advantageously 3D printing, and wherein the anchor element is inserted into the blade during the additive manufacturing process.

Herein, the additive manufacturing method can be selected from the additive manufacturing methods, advantageously 3D printing methods, as known in the art. Examples of such methods of additive manufacturing include selective laser melting (SLM), selective laser sintering (SLS), electron beam melting (EBM) and binder jetting. Naturally, other methods of additive manufacturing or specific variants of the methods mentioned before can be employed.

Using a laser based method of additive manufacturing, more advantageous 3D printing, typically provides especially useful results as such methods are well established and allow to process materials with a high temperature resistance like nickel superalloys.

However, to simplify the manufacturing process significantly it is typically advantageous to manufacture the blade as multiple components using additive manufacturing and attach the anchor element while combining such components. This allows to provide a modular system and increase the overall manufacturing speed utilizing conventional additive manufacturing devices. Herein, the blade is provided in the form of at least 2 parts advantageously manufactured using additive manufacturing like 3D printing. For example, this allows to mass manufacture the required parts and introduce the anchor element in a following step. In further embodiments it is advantageous that the blade is manufactured in the form of at least 2 parts, advantageously using additive manufacturing like 3D printing, wherein following the manufacturing of the at least 2 parts of the blade the anchor element is fastened inside the blade before the at least 2 parts of the blade are attached to each other or simultaneously while attaching the at least 2 parts of the blade to each other.

In certain embodiments it is advantageous that the parts of the blade are detachably connected to allow to exchange the anchor element during repair or service easily. However, for typical embodiments it is advantageous that the corresponding parts of the blade are inseparably connected to each other after introducing the anchor element inside the blade. This allows to, for example, provide a secure connection of the blade parts as well as a secure sealing of the cooling system inside the blade. For example, such inseparable connection can be acquired using laser welding or laser cladding.

According to a further aspect the present invention refers to a use of a blade as described above.

Preferably, such inventive blade is utilized in a gas turbine. The results obtained indicate that the possibilities to modify the operating conditions for such type of turbines provide an especially significant benefit for typical applications.

However, further results indicate that the inventive blades are also very beneficially utilized in a compressor. It is noted that utilizing the inventive concept allows to significantly increase the rotation speed of the compressor enabling a scaled-down compressor with reduced space required. Such application would be very interesting, for example, for aero applications or upgrades of existing streaming engines providing a limited room available. For example, upgrading streaming engines available on ships with such compressor allows to install bigger streaming engines with more rows of blades and vanes utilizing the existing machine room.

According to further aspect the present invention refers to a streaming engine as described above.

Examples of streaming engines beneficially containing the inventive blade are gas turbines, streaming engines in the aero sector, streaming engines in the marine sector or high-speed compressors. Results obtained indicate that, for example, a significant improvement can be obtained utilizing the inventive blade inside a gas turbine.

The present invention is only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

FIG. 1 shows a schematic cross-section along the longitudinal axis of the inventive blade 1 providing the anchor element 2. The blade 1 is adapted to be used in the gas turbine being an example of the streaming engine. The blade 1 provides a lower part 3 and an upper part 4, wherein the lower part 3 and the upper part 4 are connected by the anchor element 2. The lower part 3 of the blade provides the blade root 5 and is connected by the outer wall 12 of the blade 1 to the upper part 4 of the blade 1. The anchor element 2 is located inside the blade 1 and its central part is surrounded by a cavity 6 inside the blade 1, thus providing a cooling of the anchor element 2 with some cooling fluid streaming through the blade 1. Simultaneously, the cooling fluid it utilized to cool the outer surface 9 of the blade 1 is adapted to contact the fluid utilized to rotate the rotor containing the blade 1 inside the streaming engine.

The figure shows schematically a cooling fluid inlet 10 located in the lower part 3 of the blade 1 and a cooling fluid outlet 11 providing film cooling located on the upper part 4 of the blade 1. Not shown are further cooling elements like impingement cooling chambers or film cooling holes located inside the outer wall 12 of the blade 1.

The main part of the blade 1 is made of a nickel superalloy, while the anchor element 2 is made of graphene. The anchor element 2 is fastened by means of multiple bolts being detachably connected to the anchor element 2. Herein, the bolts extend as protrusions from a first part 7 of the blade 1 through the anchor element 2 into some cavities of a second part 8 of the blade 1. Such fastening elements are located in the upper part 4 and the lower part 3 of the blade 1. Herein, the anchor element 2 extends over 95% of the height of the blade 1, measured from the lower end to the upper end of the blade 1.

The blade 1 has been manufactured in the form of several parts using additive manufacturing. After the first part 7 of the blade 1 has been removed from the additive manufacturing device it is cleaned and the anchor element 2 is detachably connected to the bolts provided at the upper part 4 and the lower part 3 of the first part 7 of the blade 1. Hereafter, the second part 8 is inseparably connected to the first part 7 after clamping the anchor element 2 between the first part 7 and the second part 8. Hereafter, said parts are inseparably connected using laser welding to provide the secure and reliable connection as well as a seal of the cavities and cooling channels provided inside the blade 1.

Figure 2:
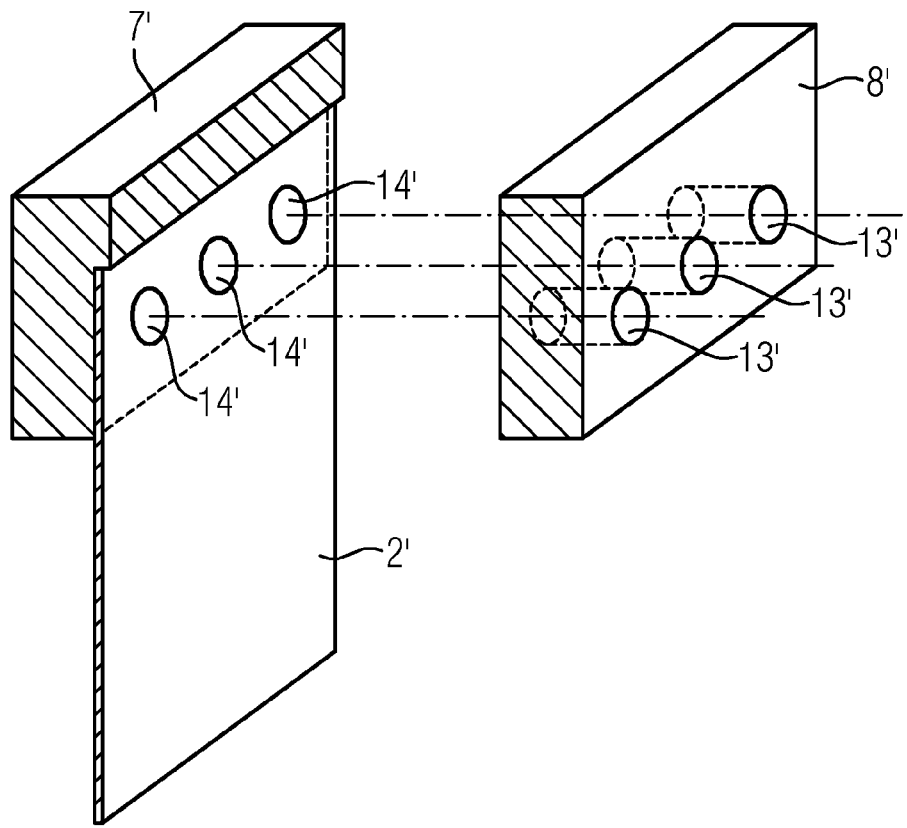
FIG. 2 shows a cutout of a schematic drawing of a different type of fastening element provided for an inventive blade.

FIG. 2 shows a cutout of a schematic drawing of a different type of fastening element provided for an inventive blade. Contrary to the embodiment as shown in FIG. 1 the fastening of the anchor element 2' is achieved by introducing bolts through holes available in the first part not shown, holes 14' in the anchor elements 2', and holes 13' in the second part. The bolts fastening the anchor element 2' are welded to the second part 8' to ensure that they maintain their position during use of the blade. During repair or maintenance, the corresponding bolts can be drilled out if required to replace the anchor element 2'.

The invention claimed is:

1. A blade adapted to be used in a streaming engine or compressor, comprising:
    a lower part,
    an upper part, and
    an anchor element that is discrete from the lower part and from the upper part,
    wherein the anchor element is completely enclosed inside of the blade, and wherein the anchor element connects the lower part and the upper part,
    wherein the lower part and the upper part are formed by two blade parts,
    wherein the two blade parts also form an airfoil of the blade,
    wherein the two blade parts have been manufactured using an additive manufacturing process,
    wherein the anchor element is detachably connected to the lower and/or the upper part of the blade, and
    wherein the anchor element is directly connected to the lower part and to the upper part.

2. The blade according to claim 1,
wherein the anchor element contains a ceramic material or carbon-based material.

3. The blade according to claim 1,
wherein at least 50% of a surface of the anchor element is surrounded by a cavity inside the blade.

4. The blade according to claim 1, further comprising:
a cooling system based on a cooling fluid, wherein the cooling fluid is utilized to cool the anchor element.

5. The blade according to claim 4,
wherein the streaming engine is adapted to utilize a fluid stream to rotate a rotor containing the blade,
wherein the blade provides an outer wall being adapted to contact the fluid stream, and
wherein the cooling system is utilized to cool the outer wall.

6. The blade according to claim 1,
wherein the anchor element extends over at least 30% of a height of the blade.

7. The blade according to claim 1,
wherein the anchor element provides at least one protrusion, at least one recess and/or at least one hole adapted to engage a counter element of the blade to fasten the anchor element inside the blade.

8. The blade according to claim 1,
wherein the anchor element comprises a carbon-based material, carbon fibers, and/or graphene.

9. A method of manufacturing a blade according to claim 1, the method comprising:
inserting the anchor element inside the two blade parts.

10. The method according to claim 9,
wherein the blade is manufactured using the additive manufacturing process, and
wherein the anchor element is inserted into the two blade parts during the additive manufacturing process.

11. The method according to claim 9,
wherein the two blade parts are manufactured, and
wherein following the manufacturing of the two blade parts of the blade the anchor element is fastened inside the two blade parts before the two blade parts of the blade are attached to each other or simultaneously while attaching the two blade parts of the blade to each other.

12. A streaming engine, comprising:
the blade according to claim 1.

13. The blade according to claim 1, wherein the anchor element is clamped between a pressure side and a suction side of the blade.

14. A blade adapted to be used in a streaming engine or compressor, comprising:
a lower part,
an upper part, and
an anchor element that is discrete from the lower part and from the upper part,
wherein the anchor element is located completely enclosed inside of the blade, and wherein the anchor element connects the lower part and the upper part,
wherein the lower part and the upper part are entirely formed by two blade parts,
wherein each blade part of the two blade parts forms a respective portion of a root of the blade and a respective portion of an airfoil of the blade,
wherein the anchor element is detachably connected to the lower part and to the upper part, and
wherein the anchor element is directly connected to the lower part and to the upper part.

* * * * *